United States Patent
Schwalm et al.

(10) Patent No.: US 10,005,467 B2
(45) Date of Patent: Jun. 26, 2018

(54) METHOD OF CONTROLLING A DUAL CLUTCH TRANSMISSION

(71) Applicant: GM Global Technology Operations LLC, Detroit, MI (US)

(72) Inventors: Jayson S. Schwalm, Farmington Hills, MI (US); Glenn W. Hoefflin, Fenton, MI (US); Daniel J. Wickman, Plymouth, MI (US); John William Boughner, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 170 days.

(21) Appl. No.: 15/251,652

(22) Filed: Aug. 30, 2016

(65) Prior Publication Data

US 2018/0057010 A1 Mar. 1, 2018

(51) Int. Cl.
| | |
|---|---|
| *B60W 10/02* | (2006.01) |
| *B60W 30/19* | (2012.01) |
| *F16H 3/00* | (2006.01) |
| *F16H 3/093* | (2006.01) |
| *F16H 61/02* | (2006.01) |
| *B60W 10/113* | (2012.01) |

(52) U.S. Cl.
CPC ............ *B60W 30/19* (2013.01); *B60W 10/02* (2013.01); *B60W 10/113* (2013.01); *F16H 3/006* (2013.01); *F16H 3/093* (2013.01); *F16H 61/0246* (2013.01); *B60W 2520/10* (2013.01); *B60W 2540/10* (2013.01); *B60W 2540/12* (2013.01); *B60W 2710/021* (2013.01); *B60W 2710/1005* (2013.01); *Y10T 477/6392* (2015.01); *Y10T 477/6394* (2015.01); *Y10T 477/647* (2015.01); *Y10T 477/6414* (2015.01)

(58) Field of Classification Search
CPC ......... Y10T 477/6392; Y10T 477/6394; Y10T 477/6414; Y10T 477/647; B60W 30/19; B60W 10/113; B60W 10/02; B60W 2540/10; B60W 2710/1005; B60W 2710/021; B60W 2520/10; B60W 2540/12; F16H 3/006; F16H 3/093; F16H 61/0246
USPC .................................................... 74/330, 331
See application file for complete search history.

(56) References Cited

U.S. PATENT DOCUMENTS

| | | | | |
|---|---|---|---|---|
| 4,461,188 | A  * | 7/1984 | Fisher ..................... | F16H 3/006 74/330 |
| 8,892,320 | B2 * | 11/2014 | Yoon ....................... | F16H 59/50 701/55 |
| 9,920,816 | B2 * | 3/2018 | Mizuno ................... | F16H 3/006 |
| 2007/0051196 | A1 * | 3/2007 | Baldwin .............. | B60W 10/113 74/335 |
| 2011/0167957 | A1 * | 7/2011 | Kato ....................... | F16D 23/06 74/665 E |

* cited by examiner

*Primary Examiner* — Roger L Pang (57) ABSTRACT

A method of controlling a dual clutch transmission (DCT) for a vehicle includes steps to reduce objectionable noise present during particular driving conditions and when the vehicle is operated using certain driving habits. A DCT engages at least two gear ratios at a time; one gear ratio for the current desired gear and a second gear ratio for the next likely gear. The method detects when conditions are favorable for the objectionable noise and takes action to remove the cause of the objectionable noise.

19 Claims, 4 Drawing Sheets

METHOD OF CONTROLLING A DUAL CLUTCH TRANSMISSION

TECHNICAL FIELD

The present disclosure relates to transmissions and more particularly to a compact, dual clutch multiple speed transmission having three axes to establish multiple gear ratios.

BACKGROUND

The statements in this section merely provide background information related to the present disclosure and may or may not constitute prior art.

A dual clutch transmission (DCT) employs two friction clutches for shifting among its forward ratios. In operation, the DCT accomplishes such shifts by alternating engagement between the two friction clutches and engagement of one of several coplanar gear sets to one of a pair of countershafts. One of the benefits of a DCT is the ability to perform quick gear ratio changes. This is accomplished by having multiple gear ratios engaged with their respective countershafts at one time.

While current DCT achieve their intended purpose, the need for new and improved transmission control methods which exhibit improved performance, especially from the standpoints of noise and vibration output that is objectionable to the vehicle operator. Accordingly, there is a need in the art for a transmission having improved noise and vibration performance while providing desirable gear ratios, torque ranges, and quick gear ratio changes.

SUMMARY

The present invention provides a method for controlling a dual clutch transmission in a vehicle. The method includes a first step of providing a dual clutch transmission having a dual clutch module, a first and second input shafts, a first and second countershafts, a plurality of coplanar gear sets, and a plurality of synchronizers capable of providing a plurality of forward torque ratios and a reverse torque ratio. A second step includes receiving a command to engage the reverse torque ratio. A third step includes shifting a first of the plurality of synchronizers to engage a reverse gear of a first of the plurality of coplanar gear sets with the first countershaft. A fourth step includes shifting a second of the plurality of synchronizers to engage a first gear of a second of the plurality of coplanar gear sets with the second countershaft. A fifth step includes engaging a first clutch of the dual clutch module. A sixth step includes detecting a plurality of events indicating an objectionable noise. A seventh step includes shifting the second of the plurality of synchronizers to disengage the first gear of a second of the plurality from the second countershaft.

In one aspect of the present invention, the step of providing a dual clutch transmission having a dual clutch module, a first and second input shafts, a first and second countershafts, a plurality of coplanar gear sets, and a plurality of synchronizers capable of providing a plurality of forward torque ratios and a reverse torque ratio further provides a dual clutch transmission having a plurality of coplanar gear sets wherein a first gear of a second of the plurality of coplanar gear sets is capable of providing a first torque ratio when engaged with the second countershaft.

In yet another aspect of the present invention, the step of detecting a plurality of events indicating an objectionable noise further includes detecting a plurality of accelerator pedal depressions and releases.

In yet another aspect of the present invention, the step of detecting a plurality of events indicating an objectionable noise further comprises detecting a plurality of brake pedal depressions and releases.

In yet another aspect of the present invention, the step of detecting a plurality of events indicating an objectionable noise further comprises detecting a plurality crossovers of the zero torque point.

In yet another aspect of the present invention, the step of detecting a plurality of events indicating an objectionable noise further includes detecting at least one of a plurality of accelerator pedal depressions and releases, detecting a plurality of brake pedal depressions and releases, and detecting a plurality crossovers of the zero torque point.

In yet another aspect of the present invention, the step of detecting a plurality of events indicating an objectionable noise further includes detecting a vehicle speed of a predetermined limit and detecting a plurality of events indicating an objectionable noise.

In yet another aspect of the present invention, the step of detecting a vehicle speed of a predetermined limit and detecting a plurality of events indicating an objectionable noise further includes detecting a vehicle speed of at least 2 kph and detecting a plurality of events indicating an objectionable noise.

In yet another aspect of the present invention, the step of detecting a plurality of events indicating an objectionable noise further comprises detecting three events indicating an objectionable noise.

The above features and advantages and other features and advantages of the present invention are readily apparent from the following detailed description of the best modes for carrying out the invention when taken in connection with the accompanying drawings.

DESCRIPTION

Figure 1:
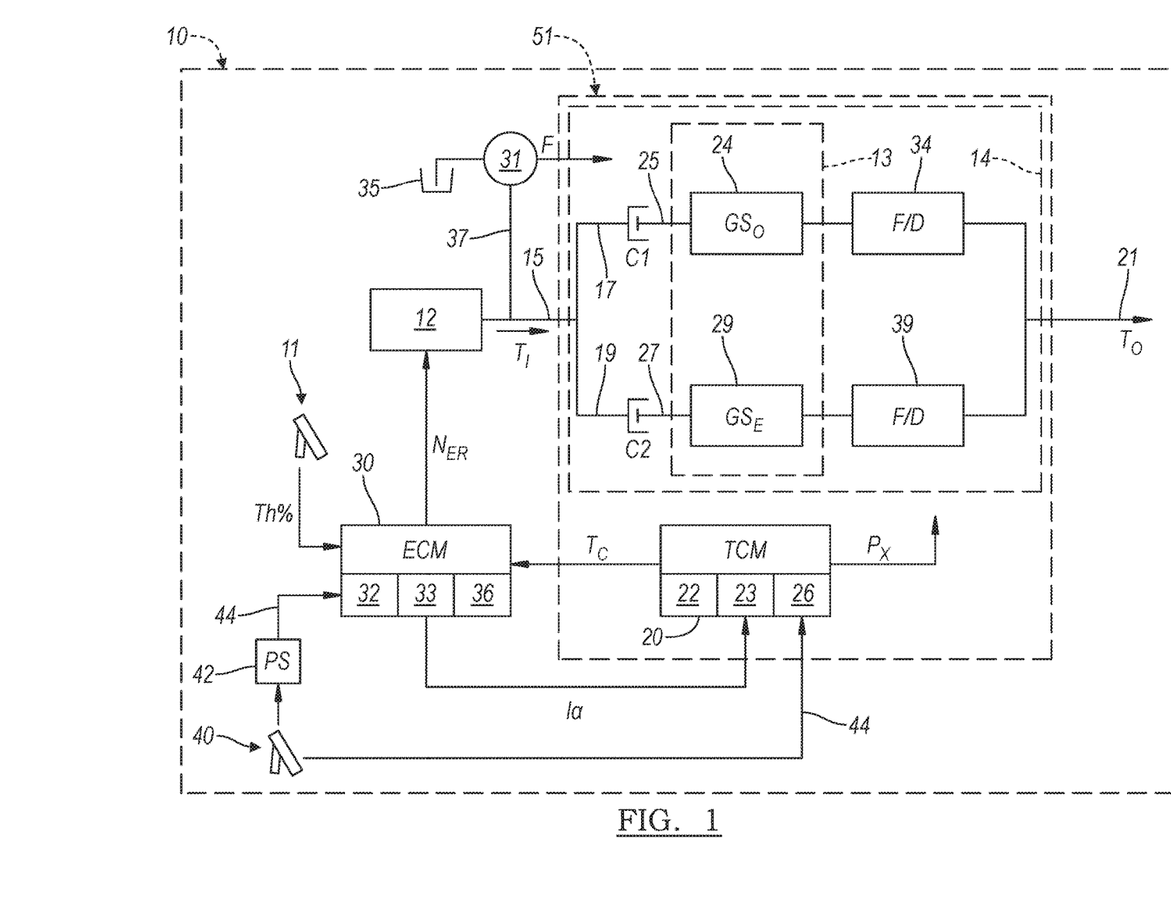
FIG. 1 is a schematic illustration of a vehicle having a dual clutch transmission (DCT) in accordance with the present invention.

Referring to the drawings, wherein like reference numbers refer to like components throughout the several figures, a vehicle 10 is shown schematically in FIG. 1. The vehicle 10 includes an internal combustion engine 12 and a dry dual clutch transmission (dDCT) assembly 51 operatively coupled to the engine 12. The dDCT includes two independently-operated input clutches, i.e., the respective first and second input clutches C1 and C2 and is characterized by an absence of a circulation of cooling or lubricating liquids to the first and second input clutches C1 and C2. The speed of the engine 12 is responsive to a received throttle request (arrow Th %), e.g., a force or a percentage of travel of an accelerator applier 11, such as an accelerator pedal, a hand applier or other suitable device, indicating a relative level of requested engine torque. Such a force/travel may be detected via a sensor (not shown). In response to receipt of the throttle request (arrow Th %), the engine 12 generates input torque (arrow TI) to the dDCT assembly 51 and delivers the input torque (arrow TI) to the dDCT assembly 51 via a rotatable drive member 15.

The vehicle 10 further includes a brake applier 40 and a brake applier position sensor (PS) 42 coupled to the brake applier 40. The brake applier 40 is coupled to the brakes (not shown) of the vehicle 10 and may be a brake pedal, a hand applier, or any other suitable device. During operation of the vehicle 10, an operator may press the brake applier 40 to apply the brakes of the vehicle 10, thereby reducing the speed of the vehicle 10. The brake applier 40 may be released to increase the speed of the vehicle 10. The brake applier position sensor 42 can detect the position of the brake applier 40 and send a brake applier position signal 44 to the ECM 30. The brake applier position signal 44 is indicative of the position of the brake applier 40. In response to the brake applier position signal 44, the ECM 30 may determine or detect whether the brake applier 40 is applied or released. For instance, the brake applier position sensor 42 may send a brake applier position signal 44 in response to a release of the brake applier 40. Thus, the brake applier position sensor 42 can communicate with the ECM 30. Although not shown in the drawings, it is contemplated that the brake applier positions sensor 42 may be in direct electronic communication with the TCM 20. Accordingly, the TCM 20 can receive the brake applier position signal 44 directly from the brake applier position sensor 42. In any case, the TCM 20 can receive the brake applier position signal 44 directly from the brake applier position sensor 42 or indirectly via the ECM 30. Hence, the TCM 20 can detect or determine whether the brake applier 40 is applied or released.

As discussed above, the vehicle 10 includes a DCT assembly 51. In turn, the DCT assembly 51 includes a dDCT 14 and the TCM 20. The dDCT 14 is an automated, manual-like transmission having a gearbox 13 with two independently-operated input clutches, i.e., the respective first and second input clutches C1 and C2 shown in FIG. 1. While omitted from FIG. 1 for illustrative simplicity, each input clutch C1 and C2 may include a center plate containing any number of friction discs, friction plates, or other suitable friction materials. In the dDCT 14, the fluid (arrow F) may be circulated only to the gearbox 13. Instead of the dDCT 14, the vehicle 10 may include a wet DCT. In a wet DCT, fluid (arrow F) may be circulated by an engine-driven fluid pump 31 to the input clutches C1, C2. Hence, instead of the dDCT 14, the vehicle 10 may include a wet DCT or any other suitable transmission. Associated electronic and hydraulic clutch control devices (not shown) ultimately control the shift operation and vehicle launch in response to instructions from various onboard controllers as explained in detail below. In the present disclosure, the TCM 20 may also be referred to as a system for controlling the DCT assembly 51, the dDCT 14, or both.

In the example dDCT 14 of FIG. 1, within each of the gear sets 24, 29, additional clutches, e.g., hydraulic piston-actuated rotating or braking clutches, may be engaged or disengaged as needed to establish the desired gear state. The reverse gear state may be controlled via the first input clutch C1. Using this type of gear arrangement, the dDCT 14 can be rapidly shifted through its available range of gears without completely interrupting the power flow from the engine 12. The arrangement of the gear sets 24, 29 of the dDCT 14 will be described in greater detail below.

The controllers of the vehicle 10 shown in FIG. 1 include at least a transmission control module (TCM) 20 and an engine control module (ECM) 30. As set forth in detail below with reference to FIGS. 2-4, the TCM 20 works in conjunction with the ECM 30 during creep of the vehicle 10 to thereby institute engine acceleration-based, closed-loop position control over any actuators of the designated input clutch, e.g., clutch pistons. For a dry DCT, the present transmission control approach may help address the fundamental variations to improve creep quality. Although such variation is typically prevalent in a dry DCT due to the lack of cooling at the friction interfaces of the input clutches, a vehicle creep having a wet DCT may also benefit from the present transmission control.

In the example vehicle 10 of FIG. 1, the dDCT 14 also includes an output shaft 21 that is connected to a set of drive wheels (not shown). The output shaft 21 ultimately transmits output torque (arrow TO) to the drive wheels to propel the vehicle 10. The dDCT 14 may include a first shaft 25 connected to the first input clutch C1, a second shaft 27 connected to the second input clutch C2, and respective odd and even gear sets 24, 29 (GSO, GSE) located within the gearbox 13, both of which may be cooled and lubricated via circulation of transmission fluid from a sump 35 via an engine-driven main pump 31, e.g., via a pump shaft 37, or alternatively via an auxiliary pump (not shown).

Within the dDCT 14, the first shaft 25 is connected to and drives only the odd gear sets 24 (GSO). The second shaft 27 is connected to and drives only the even gear sets 29 (GSE), including a reverse gear set. The dDCT 14 further includes upper and lower main shafts 17 and 19, respectively, which are connected to final drive (F/D) gear sets 34, 39. The final drive gear sets 34 and 39 in turn are connected to the output shaft 21 of the dDCT 14 and are configured to provide any required final gear reduction.

With reference to the controllers of the vehicle 10, the TCM 20 and the ECM 30 may be configured as a microprocessor-based devices having elements such as processors 22, 32, tangible, non-transitory memory 23, 33 including but not necessarily limited to read only memory (ROM), random access memory (RAM), electrically-erasable programmable read-only memory (EEPROM), flash memory, etc., and circuitry including but not limited to a high-speed clock, analog-to-digital (A/D) circuitry, digital-to-analog (D/A) circuitry, a digital signal processor or DSP, transceivers 26, 36, and the necessary input/output (I/O) devices and other signal conditioning and/or buffer circuitry.

Figure 5:
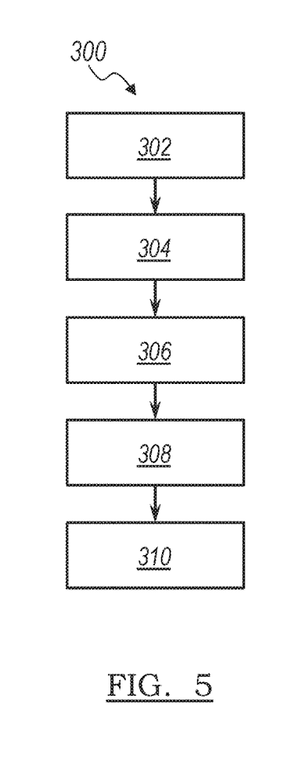
FIG. 5 is a flow chart describing an embodiment of a transmission control method for the vehicle and transmission shown in FIGS. 1-4 in accordance with the present invention.

The TCM 20 and ECM 30 are programmed to execute the required steps of the transmission control method 300, an example of which is shown in FIG. 5, with the TCM 20 in particular providing proportional, integral, derivative (PID)-based position control over the operation of a designated first and second clutch C1, C2 throughout the duration of a creep of the vehicle 10. As part of the present transmission control method, the ECM 30 may generate various control values, including an engine speed request for control of the engine 12 and an engine inertia torque (arrow Iα), the latter of which is transmitted to the TCM 20 for use in a calculation by the TCM 20 of what is referred to hereinafter as a calculated clutch torque. Ultimately, the TCM 20 uses the engine inertia torque (arrow Iα) as a feedback value in maintaining position control over the first and second clutch C1, C2, and outputs a position control signal (arrow PX) to the designated first and second clutch C1, C2 to thereby control the position of the designated first and second clutch C1, C2 in the manner described below.

Figure 2:
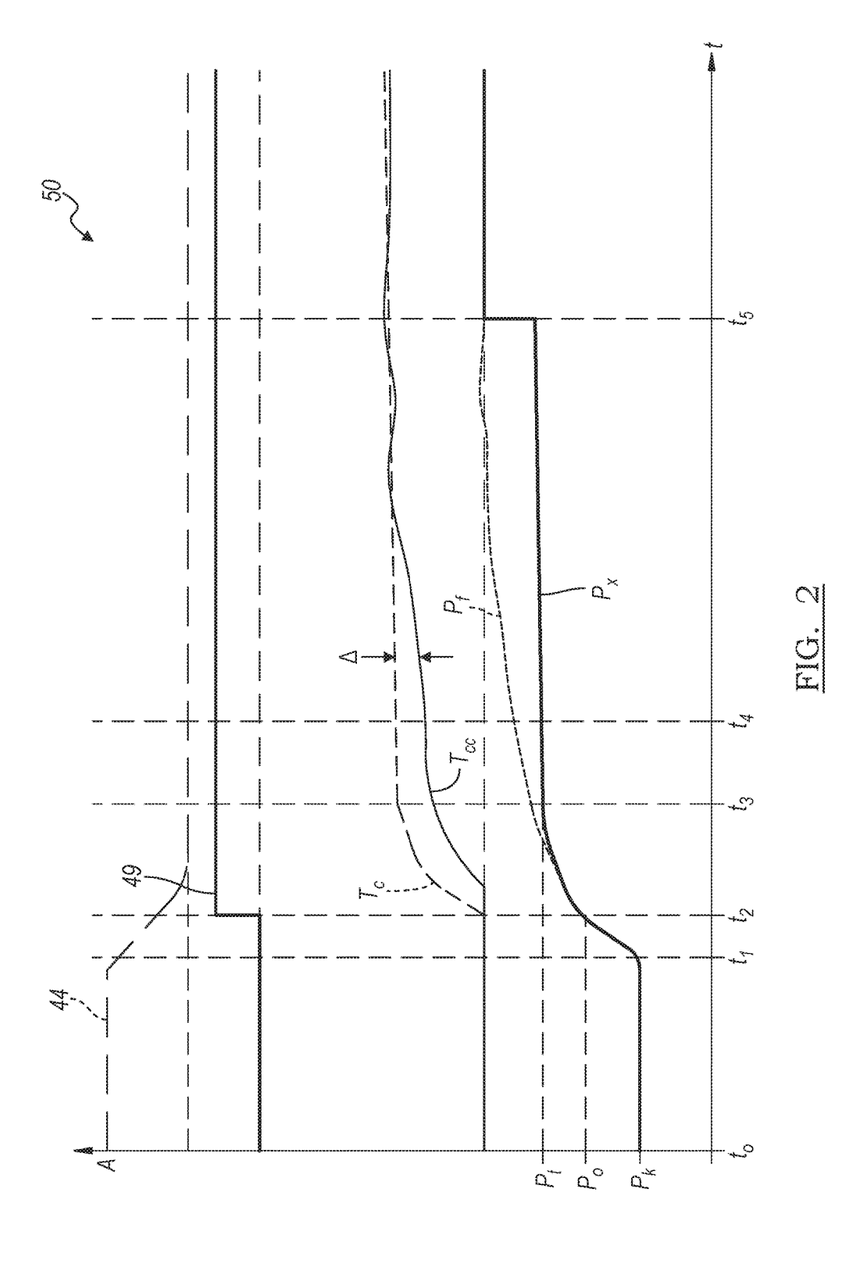
FIG. 2 is a set of time plots describing the changing amplitudes of various vehicle performance values in accordance with the present invention.

Referring to FIG. 2, a set of traces 50 is shown to describe various performance characteristics of the vehicle 10 of FIG. 1 during a reverse maneuver. In each of the traces, signal amplitude (A) is plotted on the vertical axis and time (t) is plotted on the horizontal axis. At time t0, the driver is depressing the brake applier 40 and places the transmission gear shift into a reverse R position. The TCM 20 sends a base clutch command signal to the first or second clutch C1, C2. More particularly, at time t0, when the brake applier 40 is at least partially depressed, the TCM 20 sends a kiss point position signal to the designated first or second clutch C1, C2 to thereby command the designed first or second clutch C1, C2 to be at its kiss point position Pk. At the kiss point position Pk, the designated first or second clutch C1, C2 begins to transmit torque from the engine 12. Thus, the kiss point position Pk is defined as the clutch position where the designated first or second clutch C1, C2 begins to transmit torque from the engine 12.

At or near time t1, the driver releases the brake applier 40 and the brake applier position sensor 42 sends the brake applier position signal 44 to the ECM 30, indicating that the brake applier 40 has been released. At time t2, the creep mode of the transmission dDCT 14 is activated. To do so, the TCM 20 can send a creep mode activation signal (trace 49) to the dDCT 14. In the creep mode, the dDCT 14 allows the vehicle 10 to move. In FIG. 2, the creep mode signal (trace 49) is represented as a step signal.

Another of the traces 50 shown in FIG. 2 is the commanded clutch torque (trace Tc), which rises quickly at the beginning of a vehicle creep, and then begins to settle at about time t4 as the TCM 20 makes necessary adjustments. The commanded clutch torque (trace Tc), which may be provided as a calibration value from the TCM 20, e.g., extracted from a lookup table or a torque model recorded in memory 23, may vary from the engine torque. In an embodiment, the commanded clutch torque (trace Tc) may be equal to an output engine torque. As used herein, the "command clutch torque" refers to the clutch torque necessary to creep the vehicle 10 after the brake applier 40 has been released but before the accelerator applier 11 has been applied.

FIG. 2 also illustrates a calculated clutch torque (Tcc), which may be the sum of actual engine torque and the product of engine inertia (I) and the acceleration (α) of the engine 12. The calculated clutch torque difference (Δ) between the commanded clutch torque (trace Tc) and the calculated command clutch torque (trace Tcc) is used by the TCM 20 to determine precisely when to increase or decrease a clutch position signal, and by how much, with the base clutch position signal as trace Px and the modified clutch position signal as trace Pf. In other words, the TCM 20 monitors engine reported torque and the engine inertia torque (Iα) to determine how much load is acting on the first or second clutch C1, C2 of the dDCT 14 during the vehicle creep, and then adjusts the position signal (trace Px) as needed over time.

With continued reference to FIG. 2, the base clutch position signal (trace Px) is generated by the TCM 20 of FIG. 1 and transmitted to the first or second clutch C1, C2 of FIG. 1 that is being used to control vehicle creep. As used herein, an "increased" clutch position signal is any position signal or command which results in movement of a clutch apply piston or other actuator in an apply direction of the first or second clutch C1, C2, and thus is a signal that results in an increase in clutch torque. Likewise, a "decreased" clutch position signal results in movement of a clutch apply piston or other actuator in the release direction, and thus is a signal that results in reduced clutch torque. The designed first or second clutch C1, C2 reaches its base bite point Pt at about time t3. As used herein, the bite point refers to a clutch position wherein the clutch transmits sufficient torque to move the vehicle 10 when the brake applier 40 and the accelerator applier 11 are not pressed. In other words, the bite point is a clutch position wherein the clutch transmits sufficient torque to move the vehicle 10 when the brake applier 40 is not applied and the engine 12 is operating at engine idle speeds. The base bite point Pt may be obtained from a recorded torque to position (TTP) table 60 shown in FIG. 4.

Figure 3:
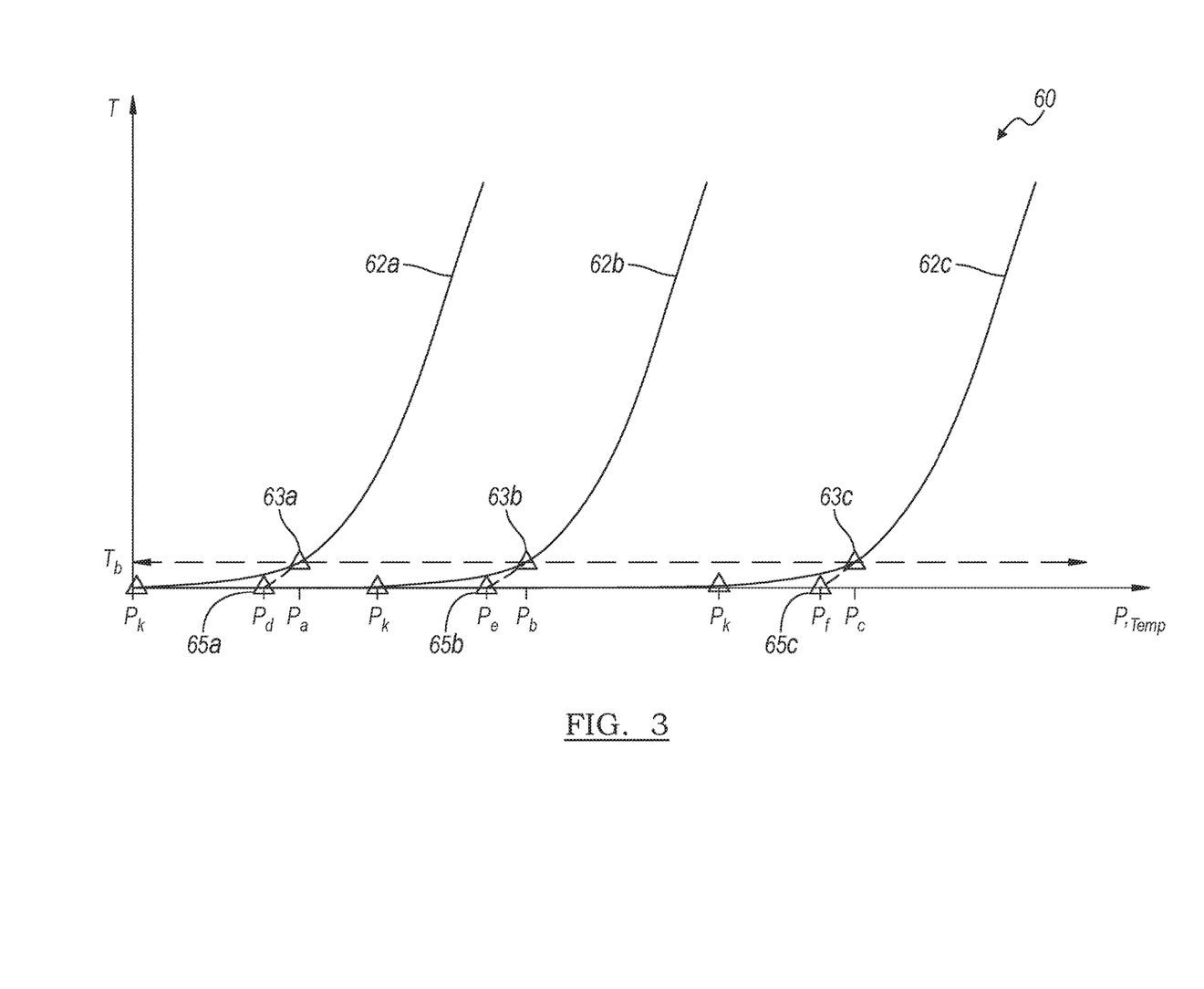
FIG. 3 is an example torque-to-position model usable with the vehicle of FIG. 1 in accordance with the present invention.

With reference to FIG. 3, a torque to position (TTP) table 60 model recorded in memory 23 of the TCM 20 (FIG. 1) is used by the TCM 20 to determine precisely how much torque (T) to command for a given clutch position (P), and vice versa. The TTP table 60 may include one or more TTP traces 62a, 62b, and 62c for different clutch temperatures regions (Temp). The TTP table includes a vertical axis having commanded clutch torque platted and a horizontal axis plotted with a clutch position P according to clutch temperature Temp. Each TTP trace 62a, 62b, and 62c includes respective calibrated bite points 63a, 63b, 63c and respective zero torque points (ZTP) 65a, 65b, and 65c derived from the bite points 63a, 63b, and 63c. The calibrated bite point points 63a, 63b, 63c may correspond to a single calibrated bite point torque Tb and to respective bite point clutch positions Pa, Pb, or Pc in each TTP trace 62a, 62b, 63c. The ZTP 65a, 65b, and 65c corresponds to a clutch position Pd, Pe, Pf at which point in the engagement of the clutch zero torque is being transferred from the engine. Thus for any particular ZTP engaging the clutch even 1 mm above Pd, Pe, Pf or 1 mm below will reverse the torque being transferred from the engine to a load being applied to the first or second clutch C1, C2 from the transmission. Reversal of torque flow is indicative of the operator passing through a torque lash zone and setting off an audible rattle or vibration.

Figure 4:
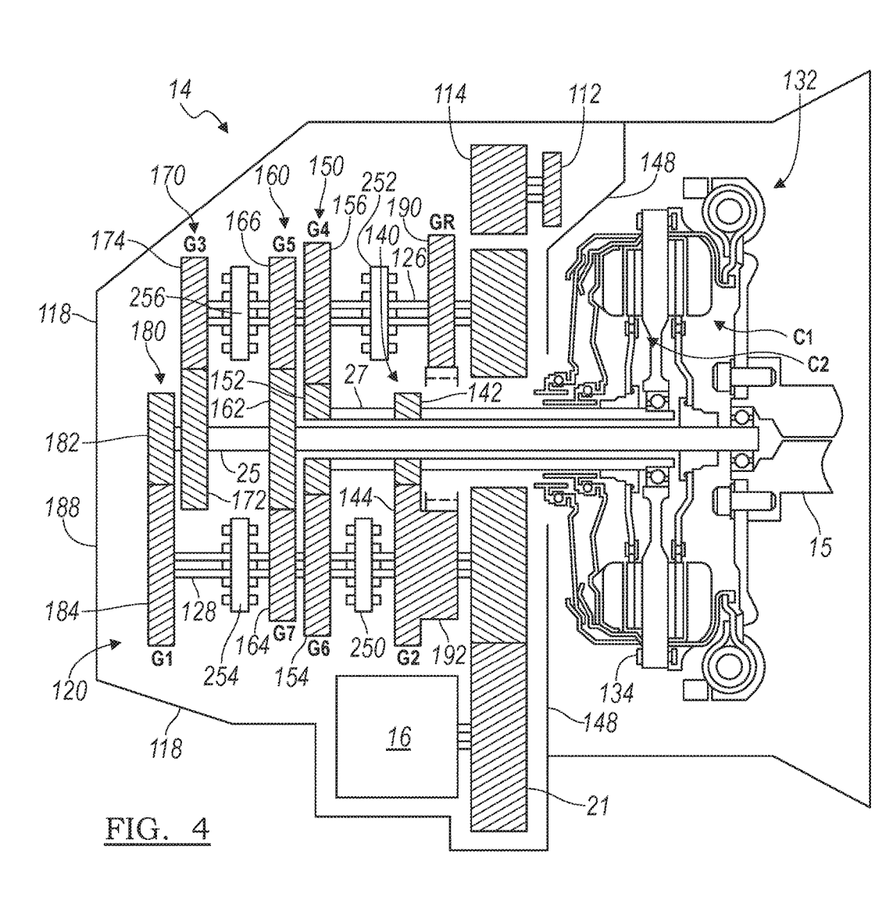
FIG. 4 is a schematic cross-section of an embodiment of a seven speed transmission, in accordance with the present invention.

Turning now to FIG. 4, an example of a dDCT transmission, shown generally in FIG. 1, is illustrated in more detail and generally indicated by reference number 14 as reference numbers carried over from FIG. 1 for like components. The transmission 14 includes an input member 15 and an output member or gear 14. In the present embodiment, the input member 15 is a shaft and the output member 21 is a gear, however those skilled in the art will appreciate that the input member 15 may be components other than shafts and the output member 21 may be a component, such as a shaft, other than a gear. For example, the input member 15 may be a clutch housing that is coupled to and receives driving torque from a flywheel.

The input member 15 is continuously connected with an engine 12 (FIG. 1) or other torque producing machine to provide a driving torque to input member 15. The output member 21 rotatably drives a differential assembly 16. The differential assembly 16 transfers torque delivered by output member 14, ultimately, to a pair road wheels (not shown).

The transmission 14 includes a housing 118 that at least partially encloses a gearing arrangement 120. The gearing arrangement 120 includes various shafts or members, co-planar intermeshing gear sets, a dual clutch assembly, and selectively engageable synchronizers, as will be described herein. For example, the gearing arrangement 120 includes a first shaft or member 25, a second shaft or member 27, a first countershaft 126, and a second countershaft 128. The second shaft or member 27 is a sleeve (hollow) shaft that is concentric with and overlies the first shaft or member 25. The first countershaft 126 and the second countershaft 128 are each spaced apart from and parallel with the first and second shafts 25, 27. The first and second shafts 25, 27 define a first axis of rotation, the first countershaft 126 defines a second axis of rotation and the second countershaft 128 defines a third axis of rotation.

A dual clutch assembly 132 is connected between the input member 15 and the first and second shaft members 25, 27. The dual clutch assembly 132 includes a clutch housing 134 connected for common rotation with the input member 15. Thus, clutch housing 134 which is supported within the transmission housing 118 provides the driving input torque to the transmission gear sets, as will be described in greater detail below. Further, the dual clutch assembly 132 has first and second clutches C1, C2. Thus, selective engagement of first clutch C1 connects the input member 15 for common rotation with the first shaft member 25. Selective engagement of the second clutch C2 connects the input member 15 for common rotation with the second shaft member 27.

The gearing arrangement 120 also includes a plurality of co-planar, meshing gear sets 140, 150, 160, 170 and 180. The present invention contemplates that the plurality of co-planar, meshing gear sets 140, 150, 160, 170 and 180 may be arranged axially along first and second shaft members 25, 27 in an order other than that which is shown in FIG. 4 and still be within the scope of the invention. Co-planar gear set 140 includes gear 142 and gear 144. Gear 142 is rotatably fixed and connected for common rotation with the second shaft member 27. Gear 144 is selectively connectable for common rotation with the second countershaft member 128 and meshes with gear 142. It should be appreciated that gear 142 may be a separate gear structure fixed to the second shaft member 27 or gear teeth/splines formed on an outer surface of the second shaft member 27 without departing from the scope of the present invention. Gear set 140 is disposed proximate a wall 148 of the transmission housing 118 that is on a front or side of the transmission 14 proximate the dual clutch assembly 132.

Co-planar gear set 150 includes gear 152, gear 154 and gear 156. Gear 152 is rotatably fixed and connected for common rotation with the second shaft member 27 and meshes with gear 154 and gear 156. Gear 154 is selectively connectable for common rotation with the second countershaft member 128. Gear 156 is selectively connectable for common rotation with the first countershaft member 126. Gear set 150 is positioned adjacent gear set 140.

Co-planar gear set 160 includes gear 162, gear 164 and gear 166. Gear 162 is rotatably fixed and connected for common rotation with the first shaft member 25 and meshes with gear 164 and gear 166. Gear 164 is selectively connectable for common rotation with the second countershaft member 128. Gear 166 is selectively connectable for common rotation with the first countershaft member 126. Gear set 160 is disposed adjacent gear set 150.

Co-planar gear set 170 includes gear 172 and gear 174. Gear 172 is rotatably fixed and connected for common rotation with the first shaft member 25 and meshes with gear 174. Gear 174 is selectively connectable for common rotation with the first countershaft member 126. Gear set 170 is positioned adjacent gear set 160.

Co-planar gear set 180 includes gear 182 and gear 184. Gear 182 is rotatably fixed and connected for common rotation with the first shaft member 25 and meshes with gear 184. Gear 184 is selectively connectable for common rotation with the second countershaft member 128. Gear set 180 is positioned between gear set 170 and an end wall 188 of the transmission housing 118.

Reverse gear 190 is selectively connectable for common rotation with the first countershaft member 126 and meshes with a reverse gear portion 192 of stepped gear 144. Reverse gear portion 192 of gear 144 is fixed for common rotation with gear 144 and may have a different gear pitch than the gear pitch of gear 144, as required, to implement a reverse gear speed. Reverse gear 190 is located between gear set 150 and end wall 148.

Further, a first countershaft transfer gear 200 is rotatably fixed and connected for common rotation with the first countershaft member 126. A second countershaft transfer gear 210 is rotatably fixed and connected for common rotation with the second countershaft member 128. First countershaft transfer gear 200 is configured to mesh with output member 21 and the second countershaft transfer gear 210 is configured to mesh with output member 21. However, the first countershaft transfer gear 200 and the second countershaft transfer gear 210 do not mesh with each other. The first countershaft transfer gear 200 is disposed between the reverse gear 190 and end wall 148 of the transmission housing 118. The second countershaft transfer gear 210 is disposed between gear 144 and end wall 148 of the transmission housing 118. The output member 21 is co-planar with first and second countershaft transfer gears 200, 210.

The transmission 14 further includes a plurality of selectively engageable synchronizer assemblies 250, 252, 254 and 256. Synchronizers 250, 252, 254 and 256 are double sided synchronizers and generally include a shift fork (not shown) that is bi-directionally translated by an actuator (not shown) into at least two engaged positions and a neutral or disengaged position. In the present embodiment, synchronizer 250 is selectively actuatable to connect gear 144 for common rotation with the second countershaft member 128 and synchronizer 250 is selectively actuatable to connect gear 154 for common rotation with the second countershaft member 128. Synchronizer 252 is selectively actuatable to connect reverse gear 190 for common rotation with the first countershaft 126 and is selectively actuatable to connect for common rotation gear 156 with the first countershaft 126. Synchronizer 254 is selectively actuatable to connect for common rotation gear 164 with the second countershaft 128 and is selectively actuatable to connect for common rotation gear 184 with the second countershaft 128. Synchronizer 256 is selectively actuatable to connect for common rotation gear 166 with the first countershaft member 126 and is selectively actuatable to connect for common rotation gear 174 with the first countershaft member 126.

The transmission 14 is capable of transmitting torque from the input shaft 15 to the output gear member 21 in at least seven forward torque ratios and at least one reverse torque ratio. Each of the forward torque ratios and the reverse torque ratio is attained by selective engagement of the dual clutch assembly 132 and one or more of the synchronizer assemblies 250, 252, 254 and 256. Those skilled in the art will readily understand that a different speed ratio is associated with each torque ratio.

It should be appreciated that each individual gear set 140, 150, 160, 170 and 180 provides one or more forward and/or reverse gear ratios upon selective engagement of the synchronizer assemblies 250, 252, 254 and 256. It should also be appreciated that a particular forward or reverse speed ratio may be achieved by different combinations of synchronizer and associated gear sets without departing from the scope of the present invention.

For example, to establish the reverse torque ratio, the second clutch C2 is engaged and synchronizer 252 is activated. Second clutch C2 couples the input member 15 with the second shaft member 27. Synchronizer 252 connects reverse gear 190 to the first countershaft member 126. More specifically, input torque from the input shaft 15 is transferred through the dual clutch assembly 132 to the second shaft member 27, through gear 142 to gear 144, through gear 144 to reverse gear 190, from gear 190 to the first countershaft member 126 through synchronizer 252 to first countershaft transfer gear 200 and from first countershaft transfer gear 200 to the output member 21.

To establish a first forward torque ratio (i.e. a 1st gear), the first clutch C1 is engaged and synchronizer 254 is activated. The first clutch C1 couples the input member 15 with the first shaft member 25. Synchronizer 254 couples gear 184 to the second countershaft member 128. Input torque from the input member 15 is transferred through the dual clutch assembly 132 to the first shaft member 25 to gear 182. Gear 182 transfers torque to gear 184 which transfers the torque to the second countershaft member 128 through synchronizer 254 and to second countershaft transfer gear 210 and then from second countershaft transfer gear 210 to the output member 21.

Similar system engagements are followed for the remaining torque ratios. In addition to being capable of arranging seven forward torque ratios and a reverse torque ratio in a compact and lightweight assembly, the transmission 14 is also capable of making quick gear ratio changes. For example, when a second torque ratio is engaged by way of activation of the second clutch C2 and engagement of synchronizer 250 with gear 192, the synchronizer of the next gear ratio, in this case synchronizer 256 would engage gear 174 to the first countershaft 126, is also engaged. This enables quick gear changes simply by alternating engagement of the second clutch C2 to engaging the first clutch C1.

A similar method of operation is used for changing gear ratios from reverse torque ratio to drive or first torque ratio. When the operator places the transmission gear selector into reverse, the TCM instructs the transmission 14 to engage the synchronizer 252 with the reverse gear 190. At the same time the synchronizer 254 translates to engage gear 184, necessary for engaging the first forward torque ratio, with the second countershaft 128. This allows a quick transition from reverse torque ratio to the first forward torque ratio by simply disengaging the second clutch C2 and engaging the first clutch C1.

However, in certain operating conditions or due to driving habits of the vehicle operator, the vehicle operator may experience unintended torque reversals on rotating components of the transmission which may result in lash rattle or vibration. Thus referring now to FIG. 5, a method 300 for controlling the dDCT 14 shown in FIG. 1 begins at a first step 302, wherein the operator of the vehicle places the transmission in the reverse torque ratio. A second step 304 engages the synchronizer 252 to the reverse gear 190 such that the reverse gear 190 and the first countershaft 126 rotate in common. At the same time, the synchronizer 254 engages gear 184 of the first forward torque ratio such that the gear 184 and the second countershaft 128 rotate in common. Finally, to complete the engagement of the reverse gear ratio, the second clutch C2 is engaged to transfer torque from the input shaft 15 through the transmission 14 to the output member 21. Next, after sustaining a speed target for a specified length of time, a third step 306 detects a plurality of events that give an indication that the second countershaft 128 is crossing through a lash zone and thus entering an audible rattle or vibration state. The speed target can be 2 KPH but may be a similar higher or lower speed without departing from the scope of the invention. Once the TCM 20 detects several events indicating that the audible rattle or vibration state is being entered, a fourth step 308 disengages the synchronizer 254 from the gear 184. The number of events that are experienced before the forth step 308 is executed can be 2 to 5 events with 3 being a most likely number of events. In this manner, gear 184, gear 182, and the first shaft 25 are no longer rotating with the second countershaft 128 and thus refrain from setting off system rattle or vibration during subsequent events.

Regarding the third step 306, there are several types of events that may cause crossing through the lash zone and the subsequent vibration. A first event includes tipping in and out of the accelerator pedal 11. At low speeds, this may cause the engine 12 to place a load on the transmission 14 when the operator presses the accelerator pedal 11 and the wheels and differential 16 to place a load on the transmission 14 in the opposite rotation when the operator releases the accelerator pedal 11. Additional loads may be caused by pitched pavement or ground causing the operator to attempt to overcome coasting or drifting by using the accelerator pedal 11.

A second event includes tipping in and out of the brake pedal 40. Like the accelerator event, the brake event can cause crossing over the lash zone which is a predictor of an audible rattle or vibration.

A third event includes detecting several crossovers of the zero torque point (ZTP) by the TCM 20. Detection of the ZTP crossover most likely indicates that the operator is detecting audible rattle or vibration. The audible rattle or vibration that is negated once the synchronizer 254 is disengaged from the first gear 184 in the fourth step 308 of the method 300.

A fifth step 310 of the method resets the counter of the third step 306 when the operator shifts the transmission out of reverse R or the speed of the vehicle drops below the speed target before reaching the specified length of time.

While the best modes for carrying out the invention have been described in detail, those familiar with the art to which this invention relates will recognize various alternative designs and embodiments for practicing the invention within the scope of the appended claims.

We claim:

1. A method for controlling a dual clutch transmission in a vehicle, the method comprising:
   providing a dual clutch transmission having a dual clutch module, a first and second input shafts, a first and second countershafts, a plurality of coplanar gear sets, and a plurality of synchronizers capable of providing a plurality of forward torque ratios and a reverse torque ratio;
   receiving a command to engage the reverse torque ratio;
   shifting a first of the plurality of synchronizers to engage a reverse gear of a first of the plurality of coplanar gear sets with the first countershaft;
   shifting a second of the plurality of synchronizers to engage a first gear of a second of the plurality of coplanar gear sets with the second countershaft; engaging a first clutch of the dual clutch module; detecting a plurality of events indicating an objectionable noise; shifting the second of the plurality of synchronizers to disengage the first gear of the second of the plurality of coplanar gear sets from the second countershaft.

2. The method for controlling a dual clutch transmission of claim 1 wherein providing the dual clutch transmission further comprises providing the plurality of coplanar gear sets wherein the first gear of the second of the plurality of coplanar gear sets is capable of providing a first torque ratio when engaged with the second countershaft.

3. The method for controlling a dual clutch transmission of claim 1 wherein detecting the plurality of events indicating an objectionable noise further comprises detecting a plurality of accelerator pedal depressions and releases.

4. The method for controlling a dual clutch transmission of claim 1 wherein detecting the plurality of events indicating an objectionable noise further comprises detecting a plurality of brake pedal depressions and releases.

5. The method for controlling a dual clutch transmission of claim 1 wherein detecting the plurality of events indicating an objectionable noise further comprises detecting a plurality crossovers of the zero torque point.

6. The method for controlling a dual clutch transmission of claim 1 wherein detecting the plurality of events indicating an objectionable noise further comprises detecting at least one of a plurality of accelerator pedal depressions and releases, a plurality of brake pedal depressions and releases, and a plurality crossovers of the zero torque point.

7. The method for controlling a dual clutch transmission of claim 1 wherein detecting the plurality of events indicating an objectionable noise further comprises detecting a vehicle speed of a predetermined limit.

8. The method for controlling a dual clutch transmission of claim 7 wherein the vehicle speed of a predetermined limit is at least 2 kph.

9. The method for controlling a dual clutch transmission of claim 1 wherein detecting the plurality of events indicating an objectionable noise further comprises detecting three events indicating an objectionable noise.

10. A method for controlling a dual clutch transmission in a vehicle, the method comprising:
    providing a dual clutch transmission having a dual clutch module, a first and second input shafts, a first and second countershafts, a plurality of coplanar gear sets, and a plurality of synchronizers capable of providing a plurality of forward torque ratios and a reverse torque ratio, and wherein a first gear of a second of the plurality of coplanar gear sets is capable of providing a first torque ratio when engaged with the second countershaft;
    receiving a command to engage the reverse torque ratio;
    shifting a first of the plurality of synchronizers to engage a reverse gear of a first of the plurality of coplanar gear sets with the first countershaft;
    shifting a second of the plurality of synchronizers to engage a first gear of a second of the plurality of coplanar gear sets with the second countershaft; engaging a first clutch of the dual clutch module;
    detecting a vehicle speed of a predetermined limit and detecting a plurality of events indicating an objectionable noise;
    shifting the second of the plurality of synchronizers to disengage the first gear of the second of the plurality of coplanar gear sets from the second countershaft.

11. The method for controlling a dual clutch transmission of claim 10 wherein detecting the plurality of events indicating an objectionable noise further comprises detecting a plurality of accelerator pedal depressions and releases.

12. The method for controlling a dual clutch transmission of claim 10 wherein detecting the plurality of events indicating an objectionable noise further comprises detecting a plurality of brake pedal depressions and releases.

13. The method for controlling a dual clutch transmission of claim 10 wherein detecting the plurality of events indicating an objectionable noise further comprises detecting a plurality crossovers of a zero torque point.

14. The method for controlling a dual clutch transmission of claim 10 wherein detecting the plurality of events indicating an objectionable noise further comprises detecting at least one of a plurality of accelerator pedal depressions and releases, a plurality of brake pedal depressions and releases, and a plurality crossovers of a zero torque point.

15. The method for controlling a dual clutch transmission of claim 10 wherein the vehicle speed of a predetermined limit is at least 2 kph.

16. The method for controlling a dual clutch transmission of claim 10 wherein detecting the plurality of events indicating an objectionable noise further comprises detecting three events indicating an objectionable noise.

17. A method for controlling a dual clutch transmission in a vehicle, the method comprising:
    providing a dual clutch transmission having a dual clutch module, a first and second input shafts, a first and second countershafts, a plurality of coplanar gear sets, and a plurality of synchronizers capable of providing a plurality of forward torque ratios and a reverse torque ratio, and wherein a first gear of a second of the plurality of coplanar gear sets is capable of providing a first torque ratio when engaged with the second countershaft;
    receiving a command to engage the reverse torque ratio;
    shifting a first of the plurality of synchronizers to engage a reverse gear of a first of the plurality of coplanar gear sets with the first countershaft;
    shifting a second of the plurality of synchronizers to engage a first gear of a second of the plurality of coplanar gear sets with the second countershaft; engaging a first clutch of the dual clutch module;
    detecting a vehicle speed of a predetermined limit and detecting at least one of a plurality of accelerator pedal depressions and releases, a plurality of brake pedal depressions and releases, and a plurality crossovers of a zero torque point;
    shifting the second of the plurality of synchronizers to disengage the first gear of the second of the plurality of coplanar gear sets from the second countershaft.

18. The method for controlling a dual clutch transmission of claim 17 wherein the vehicle speed of a predetermined limit is at least 2 kph.

19. The method for controlling a dual clutch transmission of claim 18 wherein the detecting of at least one of a plurality of accelerator pedal depressions and releases, a plurality of brake pedal depressions and releases, and a plurality crossovers of a zero torque point further comprises detecting three events of at least one of accelerator pedal depressions and releases, brake pedal depressions and releases, and crossovers of a zero torque point.

* * * * *